F. KLOUSNITZER.
CRUTCH.
APPLICATION FILED JULY 14, 1919.
1,336,844. Patented Apr. 13, 1920.
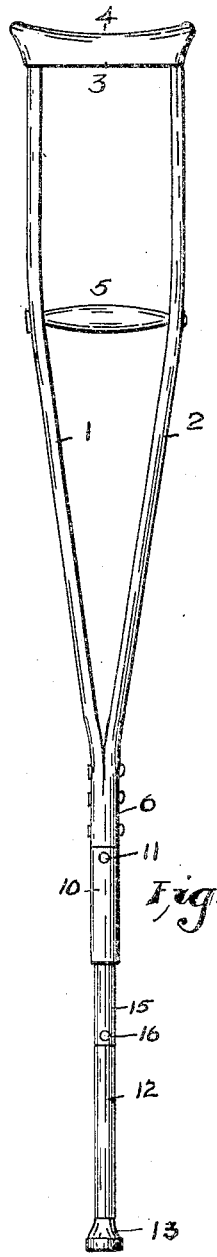
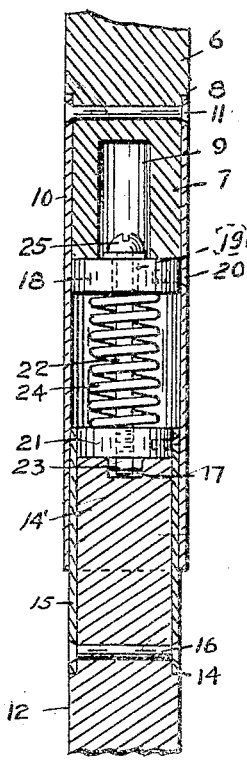
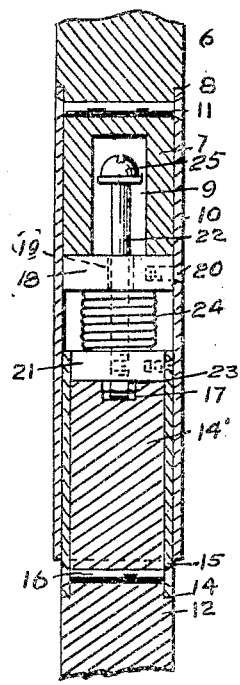
WITNESS
R. F. Dilworth
INVENTOR.
Frank Klousnitzer
By Jas R Bugbee
Attorney

UNITED STATES PATENT OFFICE.

FRANK KLOUSNITZER, OF CRAFTON, PENNSYLVANIA, ASSIGNOR OF ONE-HALF TO ROBERT SOMMER, OF PITTSBURGH, PENNSYLVANIA.

CRUTCH.

1,336,844. Specification of Letters Patent. Patented Apr. 13, 1920.

Application filed July 14, 1919. Serial No. 310,584.

*To all whom it may concern:*

Be it known that I, FRANK KLOUSNITZER, a citizen of the United States, residing at Crafton, in the county of Allegheny and State of Pennsylvania, have invented certain new and useful Improvements in Crutches, of which the following is a specification.

This invention relates to crutches, and has for its object to provide an article of such class, in a manner as hereinafter set forth, with means to set up a cushion at the bottom thereof to overcome jarring when in use, under such conditions providing a crutch which can be used in a comfortable manner, and overcoming inconvenience to the arm pit.

Further objects of the invention are to provide a crutch in a manner as hereinafter set forth which is simple in its construction and arrangement, having a telescopic cushion at its lower end, strong, durable, efficient and convenient in its use, readily set up, and comparatively inexpensive to manufacture.

With the foregoing and other objects in view the invention consists of the novel construction, combination and arrangement of parts as hereinafter set forth and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1, is an elevation of a crutch in accordance with this invention.

Figs. 2 and 3 are vertical sectional views with the cushioning element extended and compressed respectively.

Referring to the drawings in detail 1 and 2 denote the side arms of the crutch, and to the upper ends thereof is secured the head or rest 3 which has a concave top 4. The arms 1, 2 intermediate their ends have secured therebetween a handle member 5, which in connection with the head 3, maintains the upper portion of the arms 1, 2 spaced apart.

The arms 1, 2 at their lower ends terminate in a shank 6 having its lower portion 7, of less diameter than its upper portion thereby providing a peripheral shoulder 8. The lower portion 7 is formed with a lengthwise pocket 9.

Mounted upon and extending from the reduced portion 7 of the shank 6, is a sleeve 10, which abuts against the shoulder 8. The sleeve 10 is secured to the shank 6 by a transverse rivet 11.

Extending into the sleeve 10 is a telescopic stem 12 which carries on its lower end a resilient ferrule 13. The upper portion 14' of the stem 12, is of less diameter than the lower portion thereof thereby providing a peripheral shoulder 14. Mounted on and projecting above the reduced portion 14', of the stem 12, is a sleeve 15, which abuts against the shoulder 14. The sleeve 15 is secured to the stem 12 by a transverse rivet 16. The reduced portion 14' is formed with a cavity 17.

Positioned against the lower end of the reduced portion 7 of the shank 6, is a circular disk 18 provided with a central opening 19, which communicates with the pocket 9. The disk 18 is connected to the sleeve 10, by the holdfast device 20. Seated against the reduced portion 14' of the stem 12 and within the sleeve 15 is a circular disk 21 and extending through, as well as having threaded engagement with the disk 21, centrally thereof is a bolt 22, the latter depends below the disk 21 into the cavity 17. A nut 23 is mounted on the lower end of the bolt 22.

The bolt 22 extends up through the opening 19, of the disk 18, and into the pocket 9 and slides up in the latter when the stem 12 telescopes in the sleeve 10, the latter incloses the upper portion of the sleeve 15.

The disk 21 is connected to the sleeve 15, and interposed between the disks 18 and 21 is a coiled compressible and extensible spring 24, which surrounds the bolt 22, the latter has a head 25 which is arranged in the pocket 9.

What I claim is:—

1. A crutch comprising a shank, a sleeve connected thereto and projecting therefrom, said shank having its lower portion provided with a pocket, a disk secured within the sleeve against the lower end of the shank, a stem, a sleeve secured to and projecting above the stem and into the sleeve carried by the shank, a disk secured in the sleeve carried by the stem, and an expansible and contractible element interposed between the said disks within the sleeve carried by the shank.

2. A crutch comprising a shank having a handle forming element projecting thereabove and further having a pocket in its lower portion, a sleeve secured to and depending from the shank, a disk secured within the sleeve against the lower end of the shank, a stem, a sleeve secured to and extending above the stem and into the sleeve carried by the shank, a disk secured within the sleeve carried by the stem, a bolt secured to the second mentioned disk and extending through the first mentioned disk and into said pocket, and a coiled spring interposed between said disks and surrounding said bolt.

In testimony whereof I affix my signature.

FRANK KLOUSNITZER.